(12) United States Patent
Kavanagh

(10) Patent No.: US 6,809,726 B2
(45) Date of Patent: Oct. 26, 2004

(54) TOUCHSCREEN DISPLAY CALIBRATION USING RESULTS HISTORY

(75) Inventor: David A. Kavanagh, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 177 days.

(21) Appl. No.: 09/871,880

(22) Filed: Jun. 4, 2001

(65) Prior Publication Data

US 2002/0070926 A1 Jun. 13, 2002

Related U.S. Application Data

(60) Provisional application No. 60/254,668, filed on Dec. 11, 2000.

(51) Int. Cl.$^7$ ................................................. G09G 5/00
(52) U.S. Cl. ..................... 345/173; 345/178; 178/18.01
(58) Field of Search ................................. 345/173, 174, 345/175, 176, 177, 156, 178, 157, 179; 178/18.01, 18.02, 18.03, 18.09

(56) References Cited

U.S. PATENT DOCUMENTS

| | | | |
|---|---|---|---|
| 4,710,758 A | 12/1987 | Mussler et al. ............. 340/712 |
| 4,903,012 A * | 2/1990 | Ohuchi ....................... 340/709 |
| 5,241,139 A | 8/1993 | Gungl et al. .................. 178/18 |
| 5,283,559 A | 2/1994 | Kalendra et al. ............ 345/168 |
| 5,471,226 A * | 11/1995 | Suzuki et al. ................ 345/173 |
| 5,751,276 A | 5/1998 | Shih ............................ 345/178 |
| 5,804,773 A | 9/1998 | Wilson et al. ................. 178/19 |
| 5,936,615 A * | 8/1999 | Waters ........................ 345/173 |
| 5,956,020 A * | 9/1999 | D'Amico et al. ............ 345/173 |
| 6,016,140 A | 1/2000 | Blouin et al. ................ 345/178 |
| 6,181,328 B1 * | 1/2001 | Shieh et al. .................. 345/178 |
| 6,262,718 B1 * | 7/2001 | Findlay et al. ............... 345/178 |
| 6,456,952 B1 * | 9/2002 | Nathan .......................... 702/94 |
| 6,507,339 B1 * | 1/2003 | Tanaka ......................... 345/178 |
| 6,624,832 B1 * | 9/2003 | Thomas ........................ 345/863 |

* cited by examiner

Primary Examiner—Regina Liang
Assistant Examiner—Jennifer T. Nguyen
(74) Attorney, Agent, or Firm—William Eipert

(57) ABSTRACT

A method for calibration of touchscreen display coordinates includes displaying a calibration target; sensing a calibration touch for the calibration target; obtaining a calibration touchpoint coordinate for the calibration touch; determining if the calibration touchpoint coordinate is valid; and if so, storing the calibration touchpoint coordinate in a touchpoint history database and using calibration touchpoint coordinates to define a calibration reference point for operation, otherwise generating a computed reference calibration point as an average of using a predetermined number of the calibration touchpoint coordinates in the touchpoint history database.

11 Claims, 4 Drawing Sheets

TOUCHSCREEN DISPLAY CALIBRATION USING RESULTS HISTORY

Priority is claimed from Provisional Application No. 60/254,668 filed Dec. 11, 2000.

BACKGROUND OF THE INVENTION

This invention relates generally to touchscreen displays and, more particularly, to a method for calibration of touchscreen coordinates to an underlying display.

Touchscreen displays have been widely used in computer terminal applications, such as with portable and hand-held computers and with informational and point-of-purchase terminals, eliminating the need for a mouse or keyboard for most data entry functions, for example. The touchscreen consists of a touch-sensitive panel, which reports the two-dimensional touchpoint location (that is, the X-Y coordinates) at which it has been touched, coupled to a display, which may show icons or buttons to be pressed for data entry. Proper operation of the touchscreen display requires a mapping of the touch-sensitive panel coordinates to corresponding points on the display. The process used to obtain this mapping is referred to as touchscreen display calibration.

Proper touchscreen calibration is necessary in order to determine the precise coordinates of the point at which the screen is touched. In most cases, icons or symbols on the touchscreen display are sized and spaced according to the relative size of the touching member (typically, either a finger or a stylus), allowing some tolerance for error. However, there can be instances where it is important that X-Y coordinates of a touch location be very closely pinpointed. Moreover, there can be instances where poor calibration can lead to inaccurate data entry or can cause a customer or employee to be misunderstood or frustrated by what seems to be incorrect or unintended response to a screen entry.

It should be noted that a touchscreen can employ one of a number of technologies using resistive, capacitive, acoustic frequency, or other types of signals. Typically, a touchscreen is implemented by adhering a touch-sensitive, substantially transparent film to the surface of a display monitor, such as a CRT. A touchscreen controller coupled with this film is adapted to sense touch and to indicate the position on the film at which contact is made. While there are a number of different types of touchscreens, the present invention is applicable to any technology used in the touchscreen arts for reporting the coordinates of a touch contact.

The term "calibration", as used in the present invention, refers to the mapping that provides correct alignment of touch panel coordinates to display coordinates. This is in contrast to other types of measurement that are also called "calibration" in other contexts, such as methods for setting signal threshold sensitivity for touch detection, as in U.S. Pat. No. 6,016,140 (Blouin et al.) or methods for improving overall touchscreen accuracy to compensate for geometric touch-sensitive panel characteristics, such as in U.S. Pat. No. 5,804,773 (Wilson et al.)

In conventional touchscreen calibration, an operator is prompted to touch two or more reference points on the touchscreen. These points can then be used to calibrate the coordinates of the touch-sensitive panel to its underlying display. The actual coordinates at which the customer touches the screen for calibration provides one or more "touchpoints" that serve as reference points for this positional calibration. The system stores these calibration touchpoints and performs any necessary scaling and coordinate adjustment based on these touchpoints.

In an effort to automate this conventional calibration sequence, U.S. Pat. No. 5,283,559 (Kalendra et al.) discloses an automated routine for calibration of a capacitive touchscreen. In the scheme disclosed in U.S. Pat. No. 5,283,559, fixed contacts are embedded in the surface of a touchscreen, positioned outside of the active video display area. These contacts can be periodically activated by touchscreen controller logic to emulate a touch, so that an automatic routine can make any necessary adjustment in X-Y coordinate mapping for the touchscreen. Such a system, however, must be configured when the touchscreen monitor is manufactured and may not be implemented in a particular touchscreen system. Moreover, this system does not directly map points on the actual display screen of a software application program to touch panel coordinates. The type of mapping provided in U.S. Pat. No. 5,283,559 only provides reference coordinates that map touch panel corners to extreme points on the display screen, at points offset from the active screen area controlled by the application software.

While conventional methods and attempts to automate conventional methods are capable of providing some measure of calibration accuracy, there is room for improvement. Field experience with kiosk-based systems that are operated by consumers or retail store employees indicates that a percentage of problems requiring service calls and complaints can be traced to poor touchscreen calibration. Factors such as individual operator tendencies, drift and component aging, parallax error, and manufacturing differences mean that calibration accuracy can vary from one site to another or even between two operators at the same site. In some cases, for example, the actual position of an expected reference point has been shown to be offset from the reference point as used by touchscreen controller logic for computation in the calibration routine. Alteration of the expected reference point is difficult to implement once a touchscreen monitor is shipped to the field.

Thus, it can be seen that there is a long-felt need for a touchscreen calibration method that adapts to manufacturing differences and to operator tendencies at a particular site, and that provides improved accuracy as a touchscreen monitor is used over time.

SUMMARY OF THE INVENTION

In accordance with one aspect of the present invention, there is provided a method for calibrating touchscreen display coordinates. The method comprises displaying at least one calibration target, the calibration target corresponding to a previously determined calibration reference point; sensing a calibration touch for at least one calibration target; obtaining a calibration touchpoint coordinate for the calibration touch; determining if the calibration touchpoint coordinate is valid; and if so, storing the calibration touchpoint coordinate in a touchpoint history database and using the calibration touchpoint coordinate to define a calibration reference point for operation, otherwise generating a computed reference calibration point using a predetermined number of calibration touchpoint coordinates in the touchpoint history database.

In accordance with another aspect of the present invention, there is provided a method for calibrating touchscreen display coordinates. The method comprises maintaining a touchpoint calibration history based on plurality of touchscreen calibration coordinates; receiving a calibration touchpoint coordinate corresponding to a calibration target;

determining if the calibration touchpoint coordinate is valid; and if the calibration touchpoint coordinate is not valid, providing a computed reference calibration point based on the touchpoint calibration history.

DETAILED DESCRIPTION OF THE INVENTION

Figure 1A:
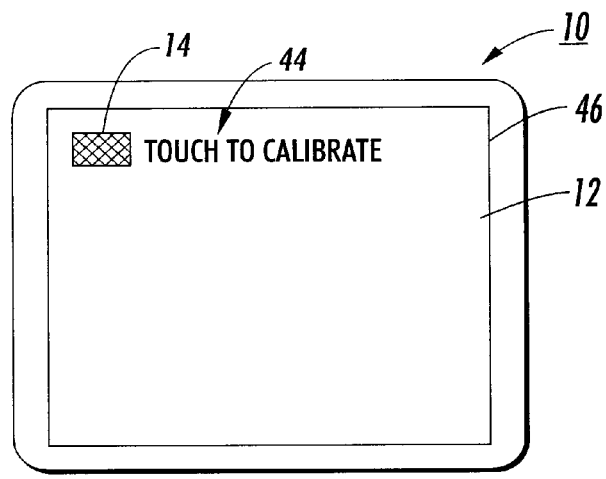
FIGS. 1A and 1B depict a conventional sequence of on-screen touch-points provided for coordinate calibration of a touchscreen display.

The following will be a detailed description of the drawings illustrating the present invention. In this description, as well as in the drawings, like referenced numbers represent devices, circuits, or equivalent circuits which perform the same or equivalent functions. While the present invention will be described in connection with an embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1B:
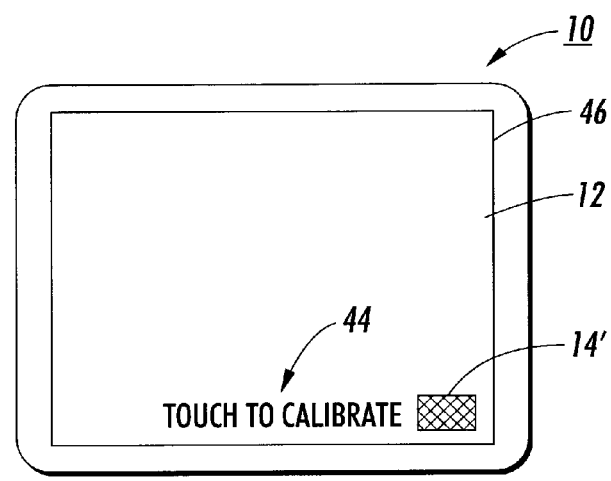

Turning now to FIGS. 1A and 1B there is shown a touchscreen display 10 having touchscreen surface 12 overlaid on an underlying display device 46, wherein the touchscreen surface operates to sense and report the coordinate position of an operator touch. In a conventional calibration procedure, a first touchscreen target 14 is displayed on touchscreen display 10, typically with an operator prompt 44. Touchscreen display 10 typically is calibrated using one or more touchscreen targets 14, such as targets 14 and 14' that define the edge of the calibration screen such as the side of a square or rectangle or the shape of the calibration screen such as corners of a square, rectangle, triangle or other shape, as is represented in the sequence of FIGS. 1A and 1B. The calibration targets can be displayed either simultaneously with a prompt to touch each displayed target or sequentially with the subsequent targets being displayed only after sensing a touchpoint for the previous target.

Figure 2:
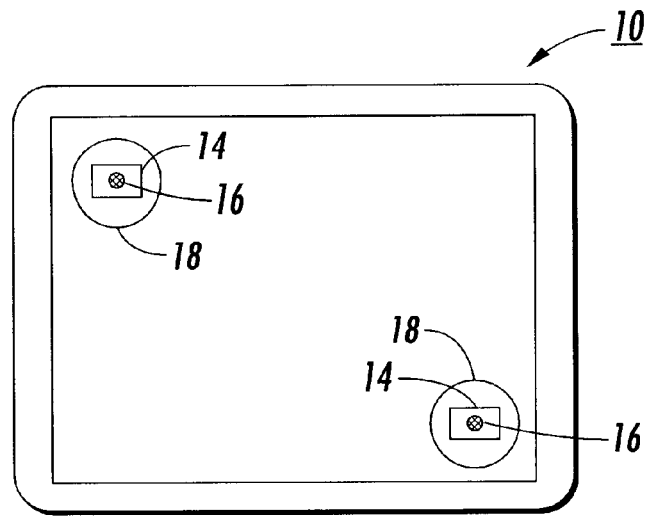
FIG. 2 shows a touchscreen display with regions indicating the range of acceptable coordinate values for touchscreen calibration.

Referring now to FIG. 2, there is shown the basic structure used for conventional touchscreen display 10 calibration. A calibration reference point 16, located at coordinates corresponding to the approximate center of touchscreen target 14, defines the center of an acceptable coordinate boundary 18. In response to operator prompt 44, the operator touchpoint must be sensed at some coordinate within acceptable coordinate boundary 18. An operator touchpoint outside boundary 18 is typically rejected and a default calibration is used.

As noted above, the actual calibration touchpoint at which an operator touches on target 14 can vary, causing subsequent mapping of touchscreen surface 12 coordinates to underlying screen display 46 to vary also. Even where the operator touchpoint is within acceptable boundary 18, there can be problems in achieving a close correlation between touchscreen surface 12 coordinates and pixel addresses on underlying screen display 46, resulting in possible misalignment and incorrect command entry.

Figure 3:
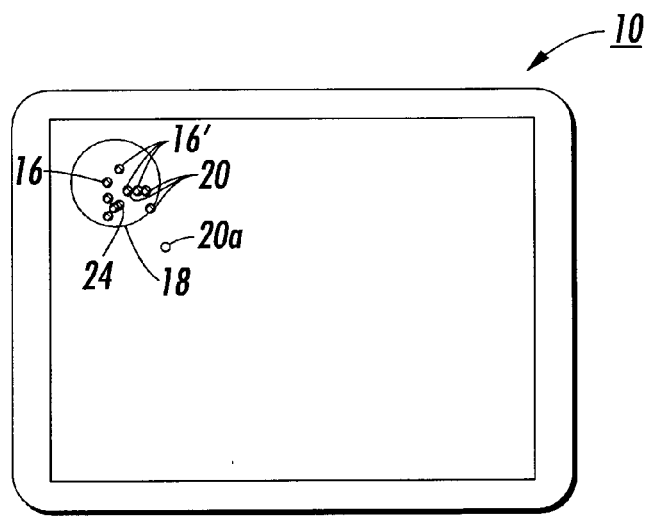
FIG. 3 shows a touchscreen display with a cluster of actual touch-points as stored for one touchpoint and the effect of averaging actual touch-point locations on adjusting the center of the range of acceptable coordinate values for touchscreen calibration.

Referring to FIG. 3, there is shown, by way of example, how the present invention operates and compensates for repeated variation in operator touch accuracy. Calibration reference point 16 defines acceptable coordinate boundary 18. Coordinate boundary 18 is shown as a radius (circle), however, it is understood that boundary 18 may take other shapes such as a square, rectangle, ellipse, etc. as well. When an actual touchpoint 20 is within acceptable coordinate boundary 18, the coordinates of the actual touchpoint 20 serve as calibration reference point 16' until a subsequent calibration procedure is performed. However, when actual touchpoint is outside acceptable coordinate boundary 18, as shown at point 20a in FIG. 3, a computed reference calibration point 24 is determined. In accordance with the present invention, the generation of computed reference calibration point 24 uses data obtained from previous successful calibration operations.

Figure 4:
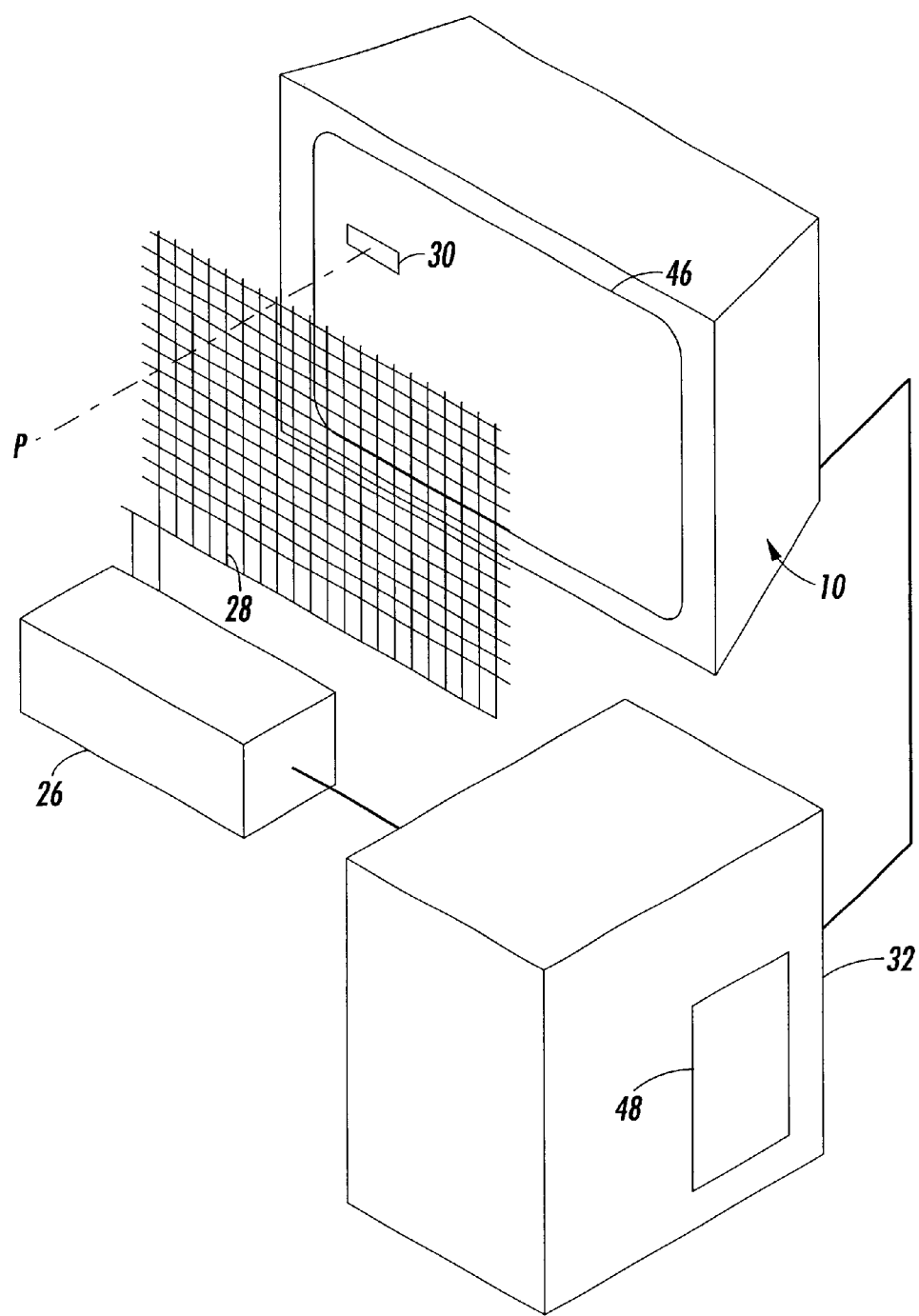
FIG. 4 is a perspective view showing the function of touchscreen controller circuitry in identifying touchscreen display coordinates.

Turning to FIG. 4, there is shown a diagram of the components that cooperate in order to achieve proper calibration of touchscreen display 10. A touchscreen matrix 28 (shown as if raised above the surface of underlying display 46 for visibility) is coupled to the surface of touchscreen display 10. Touchscreen matrix 28 communicates with a touchscreen controller 26 that, in turn, communicates coordinate data to control logic processor 32. In actual embodiments, touchscreen controller 26 may be built into the chassis of touchscreen display 10. Alternately, touchscreen controller 26 may be a separate unit or may be embodied as a control board within control logic processor 32. Control logic processor 32 may be a computer or may be embodied as a control logic printed circuit board within some other control device. Control logic processor 32 further comprises storage device (e.g., memory) 48 which functions as a database in which coordinates entered for each valid calibration operation are stored. As represented in FIG. 4, touchscreen matrix 28 must be aligned with locations on underlying display 46. For example, Point P must align properly with a point on an on-screen button 30.

Figure 5:
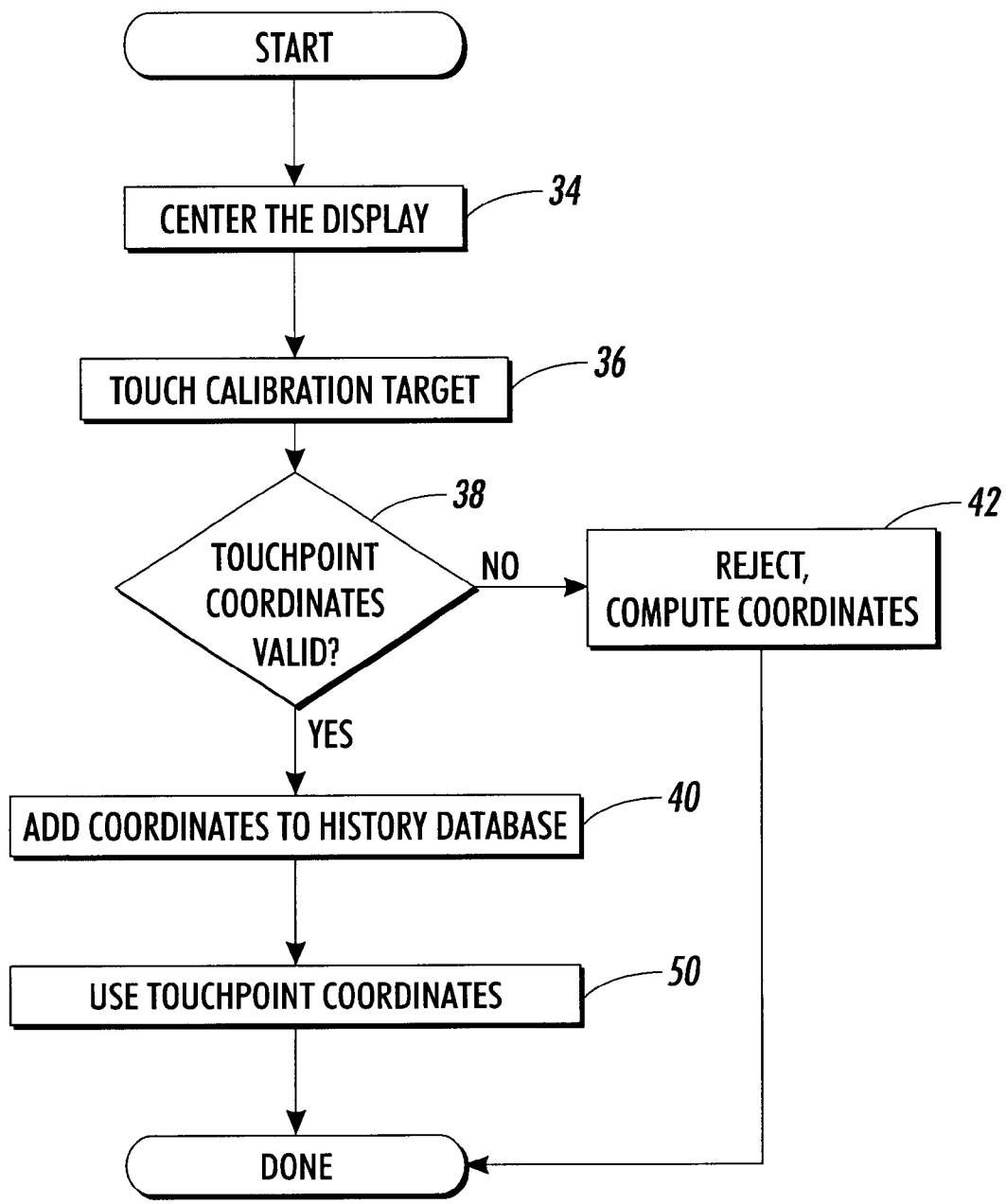
FIG. 5 is a flowchart showing a sequence for recomputing a reference point based on operator calibration results in accordance with the present invention.

FIG. 5 shows the logic sequence carried out for touchscreen display 10 calibration by control logic processor 32. In a prerequisite centering step (step 34), the operator is instructed to verify that underlying display 46 is centered. In a typical system, a rectangular frame is displayed, and the operator is instructed to make any vertical or horizontal hold adjustments necessary to center the displayed frame. After having verified that the underlying display 46 is centered, control logic processor 32 executes touch step 36 wherein an operator is prompted to touch one or more calibration targets 14, such as are shown in FIGS. 1A and 1B. Control logic processor 32 obtains the coordinates of the actual touchpoint 20 for each calibration target displayed.

In a decision step 38, control logic processor 32 checks to determine whether the coordinates of each actual touchpoint 20 obtained in step 38 are valid. That is, referring back to FIG. 2, processor 32 determines whether the coordinates for each touchpoint 20 are within an acceptable coordinate boundary 18. It should be appreciated that coordinate boundary 18 may be a fixed boundary that is measured from or based on the location of calibration reference point 16. Alternatively, coordinate boundary 18 may be based on statistical metrics derived from touchpoint coordinates for previous valid calibration operations.

If the touchpoint 20 coordinates are verified to be within an acceptable coordinate boundary 18, control logic processor 32 stores these verified coordinates in database 48 at accept coordinates step 40. Control logic processor 32 then uses the verified touchpoint 20 coordinates (use touchpoint coordinates step 50) as calibration reference point 16', as is shown in FIG. 3. On the other hand, if the coordinates for an actual touchpoint 20 are not valid, control logic processor 32 executes recomputation step 42. In computation step 42, control logic processor 32 generates a computed reference calibration point 24 and uses this computed calibration reference point as the "touchpoint" coordinates for the associated calibration target.

The present invention contemplates a number of alternative techniques for generating a computed calibration reference point in computation step 42. In one embodiment, step 42 obtains a simple average of verified coordinate values retrieved from database 48. The average can be determined by first ascertaining, for each the verified touchpoint coordinates from database 48 used, the Euclidean distance between the verified coordinates for a calibration target 14 and calibration reference point 16, as is well known in the applied mathematical arts. Then, computation of the average continues by summing these distances and dividing by the number of verified coordinates used. This operation provides an offset that is then subtracted from calibration reference point 16 to determine computed reference calibration point 24.

As one alternative, step 42 may use only the most recent verified coordinates when generating average coordinate values. For example, step 42 may use the coordinates from up to 15 verified actual touchpoints for the averaging computation. For example, such an operation can be performed by only retrieving the most recent verified coordinates that have been stored. Alternatively, the database may only retain a selected number of the most recent verified coordinates. Another option for generating the computed calibration reference point uses a weighted average. For such a method, the most recent coordinates of each actual touchpoint 20 are multiplied by a weighting factor to increase the influence of the most recent calibration touches in the overall computation. Older readings may be correspondingly reduced in influence by multiplying the older reading by a fractional weighting factor. Weighting factor values are determined empirically using well known techniques.

The above specification describes one embodiment of the present invention. However, other embodiments are allowable, within the scope of the present invention. For example, the number of coordinates stored in database 48 can be varied to suit an individual application. More complex computation, such as using standard deviation or other statistical metrics could be used to determine whether or not specific coordinates of actual touchpoint 20 are acceptable. The invention could be applied to any type of touchscreen display 10, such as computers and hand-held memory devices. The present invention works with touchscreen displays 10 that require, one, two, or more calibration targets 14 for accurate calibration. Calibration logic can be used to provide recomputed reference point 24 each time calibration takes place or at some other interval.

In summary, the present invention provides a method for touchscreen display calibration conditioned by the history of previous results. Although the present invention has been described in detail above, various modifications can be implemented without imparting from the spirit. For example, the present invention has been described as maintaining a list of verified touchpoint coordinates. However, it should be appreciated that as an alternative to or in addition to the set of coordinates, the database can store a recomputed touchpoint for each calibration target. In this embodiment, when the verified coordinates of a calibration target are stored, the system automatically generates a "current" recomputed calibration reference point to be used if the calibration operation fails to obtain a valid touchpoint.

While the present invention has been described with reference to various embodiments disclosed above, it is not confined to the details to support the above, but is intended to cover such alternatives, modifications, and variations as may come within the scope of the attached claims.

What is claimed is:

1. A method for calibration of touchscreen display coordinates by an operator comprising:

(a) displaying at least one calibration target, the calibration target corresponding to a calibration reference point;

(b) sensing a calibration touch for the at least one calibration target;

(c) obtaining a calibration touchpoint coordinate for the calibration touch;

(d) determining if the calibration touchpoint coordinate is valid by comparing the calibration touchpoint coordinate to a coordinate boundary defined by selected valid calibration touchpoint coordinates for the calibration target stored in a touchpoint history database comprising a plurality of valid calibration touchpoint coordinates obtained from sensed calibration touches for the calibration target; and (e) if so, storing the calibration touchpoint coordinate in the touchpoint history database and using the calibration touchpoint coordinate to define a calibration reference point for operation, otherwise generating a computed reference calibration point using a predetermined number of the plurality of valid calibration touchpoint coordinates stored in the touchpoint history database.

2. The method according to claim 1, wherein step (e) generates the computed reference calibration point as an average of a predetermined number of the calibration touchpoint coordinates in the touchpoint history database.

3. The method according to claim 2, wherein the computed reference calibration point is generated using a weighted average of a predetermined number of the calibration touchpoint coordinates in the touchpoint history database.

4. The method according to claim 2, wherein step (d) compares the calibration touchpoint coordinate to a standard deviation of the selected calibration touchpoint coordinates defining the coordinate boundary.

5. The method according to claim 1, wherein the coordinate boundary is defined by a statistical metric of the selected calibration touchpoint coordinates in the touchpoint history database.

6. A method for calibration of touchscreen display coordinates, comprising:

(a) maintaining a touchpoint calibration history comprising a plurality of touchpoint coordinates obtained from calibration touches for a calibration target;

(b) receiving a calibration touchpoint coordinate corresponding to the calibration target;

(c) determining if the calibration touchpoint coordinate is valid by comparing the calibration touchpoint coordinate to a coordinate range defined by selected calibration touchpoint coordinates from the touchpoint calibration history; and (d) if the calibration touchpoint coordinate is not valid providing a computed reference calibration point based on the touchpoint calibration history.

7. The method of claim 6, wherein the touchpoint calibration history comprises a list of valid calibration touchpoint coordinates and step (d) provides the computed reference calibration point by computing an average of a predetermined number of the calibration touchpoint coordinates in the touchpoint calibration history.

8. The method according to claim 7, wherein step (d) provides the computed reference calibration point by computing a weighted average of a predetermined number of the calibration touchpoint coordinates in the touchpoint calibration history.

9. The method according to claim 6, wherein the touchpoint calibration history comprises a list of valid calibration touchpoint coordinates and wherein step (c) compares the calibration touchpoint coordinates to a coordinate range defined by a statistical metric of the selected calibration touchpoint coordinates from the touchpoint calibration history.

10. The method according to claim 6, wherein the touchpoint calibration history comprises a list of valid calibration touchpoint coordinates and wherein step (c) compares the calibration touchpoint coordinates to a coordinate range defined by a standard deviation of the selected calibration touchpoint coordinates from the touchpoint calibration history.

11. The method according to claim 6, wherein the touchpoint calibration history comprises the computed reference calibration point and step (a) maintains the touchpoint calibration history by generating a recomputed reference calibration point using the computed reference calibration point and a calibration touchpoint coordinate.

* * * * *